J. A. KIMBALL.
SUPPORTING STAND.
APPLICATION FILED JULY 11, 1917.
1,261,551.
Patented Apr. 2, 1918.
2 SHEETS—SHEET 1.
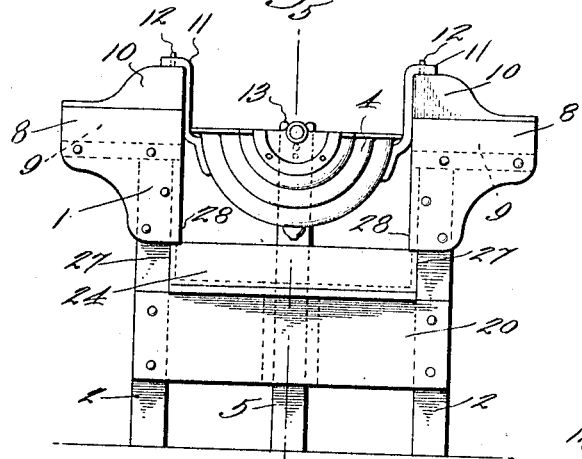
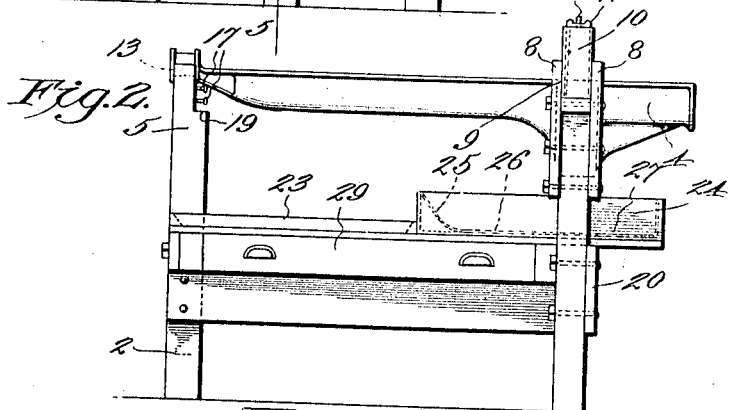
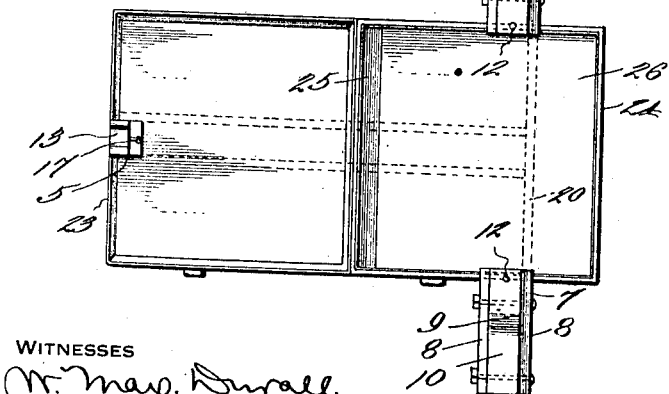
WITNESSES
INVENTOR
J. A. Kimball,
BY Victor J. Evans
ATTORNEY J. A. KIMBALL.
SUPPORTING STAND.
APPLICATION FILED JULY 11, 1917.
1,261,551.
Patented Apr. 2, 1918.
2 SHEETS—SHEET 2.
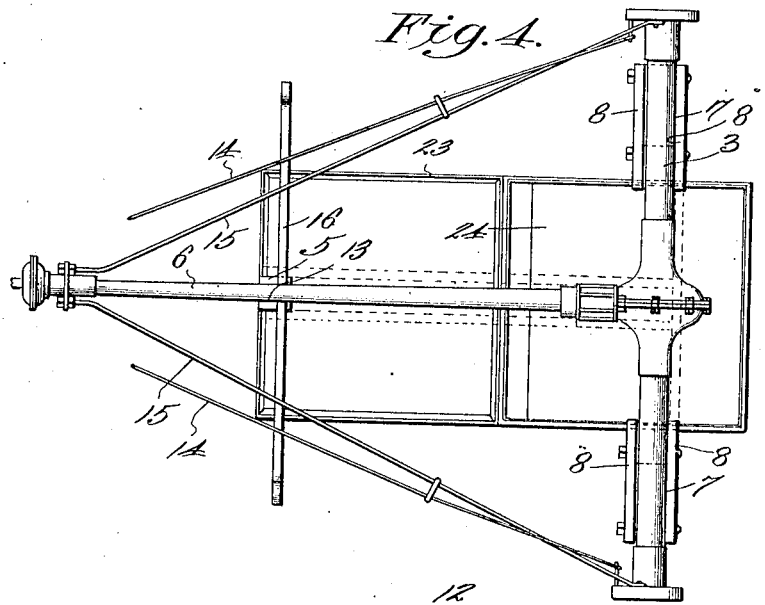
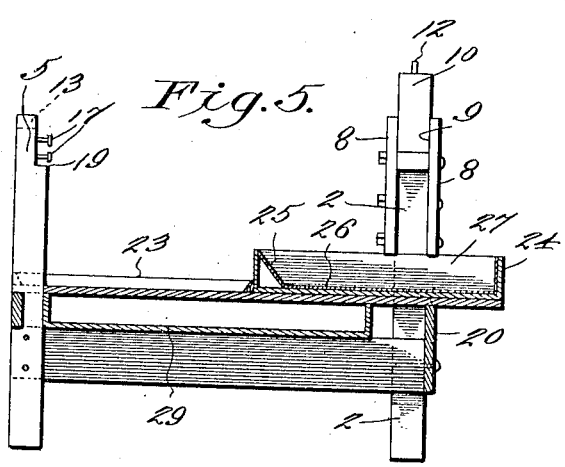
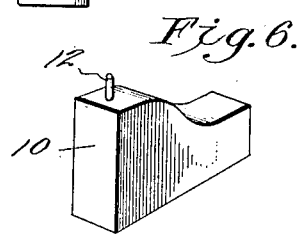
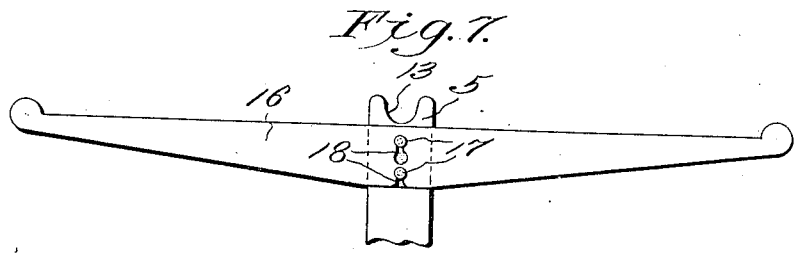
WITNESSES
W. May. Duvall.
D. B. Phillips.
INVENTOR
J. A. Kimball,
BY Victor J. Evans
ATTORNEY

UNITED STATES PATENT OFFICE.

JOHN A. KIMBALL, OF TAYLORSVILLE, ILLINOIS.

SUPPORTING-STAND.

1,261,551.   Specification of Letters Patent.   Patented Apr. 2, 1918.

Application filed July 11, 1917. Serial No. 179,905.

*To all whom it may concern:*

Be it known that I, JOHN A. KIMBALL, a citizen of the United States, residing at Taylorsville, in the county of Christian and State of Illinois, have invented new and useful Improvements in Supporting-Stands, of which the following is a specification.

This invention relates to improvements in work-stands for supporting automobile parts, and refers particularly to a combination rear axle and engine stand.

The primary object of the invention is to provide a stand which is adapted for supporting either an engine or a rear axle and associated parts in a convenient position for assembling, disassembling or repair.

Another object is to furnish a stand which will securely support the parts without the use of bolts or other attaching means such as commonly employed.

A further object is to provide a more efficient arrangement of tool trays and other auxiliary devices whereby work on the parts is facilitated.

With these and other objects in view I have embodied the invention in the novel construction, combination and arrangement of parts, described in the specification below, set forth in the claims, and depicted in the accompanying drawings.

In the drawings:—

Figure 1 is a rear elevation of the stand with an engine mounted thereon.

Fig. 2 is a side elevation of the same.

Fig. 3 is a top plan view of the same.

Fig. 4 is a top plan view showing a rear axle and associated parts in position on the stand.

Fig. 5 is a vertical longitudinal section on the line 5—5 of Fig. 1.

Fig. 6 illustrates one of the detachable engine-supports.

Fig. 7 shows the detachable shaft-housing support in detail.

Referring to the drawings more specifically, the stand 1 comprises a pair of vertical standards 2 of convenient height and spacing for supporting a rear axle 3 or one end of a motor 4, and a standard 5 suitably spaced apart from the first mentioned standards a suitable distance for supporting a drive shaft housing 6 or the other end of the motor. The upper end of each standard 2 is adapted for receiving one of the rear axle halves to facilitate assembling or disassembling; for which purpose the standards 2 are capped with alined bearing-members 7 secured in position by bracket-plates 8 bolted or otherwise properly attached to the sides of the standards and bearing-members. The bracket-plates 8 extend upwardly from the bearing-members 7 to form therewith alined pockets 9 for secure retention of the axle 3 when the device is used as an axle stand, and the pockets 9 are further utilized for receiving suitable means for supporting a motor 4 when the device is used as a motor stand, such means consisting in the present instance of blocks 10 suitably formed for engaging with the hanger-irons 11 of the motor, and having pins 12 projected from the upper surface for engaging in the bolt-holes of the iron.

The standard 5 is preferably formed in the upper surface with a channel 13 at a right angle to the pockets 9 for receiving the front end of the crank case of the motor 4 when the device is used as a motor stand, and the drive-shaft housing 6 when used as an axle stand; and for supporting the brake rods 14 and tie rods 15, or other parts usually associated with the rear axle, a cross arm 16 is provided for detachable engagement on the upper end of the standard 5. For this purpose, I preferably provide headed studs 17 projecting from the standard 5 for engaging in slotted openings 18 wherewith the cross arm 16 is formed; and for additional support a shoulder 19 may be adapted to coincide with the lower face of the arm 16 provided on the standard 5.

For rigidly connecting the standards I may use a brace 20 bolted or otherwise properly secured at each end to a standard 2, and affixed to the brace 20 intermediately of the ends twin braces terminally attached to the standard 5. The braces are disposed at a convenient height for sustaining a bench-top suitably attached thereto and provided at the end toward the standard 5 with a tool-retaining ledge 23 and adapted at the other end for supporting a drip-pan 24. One side 25 of the drip pan 24 is arranged in sloping relation to the bottom 26 to facilitate removal of grease or dirt and the adjacent sides 27 are adapted to slidably engage under projecting portions 28 of the bracket-plates, whereby the pan 24 will be retained in position when partially drawn out. Suitable drawers 29 for tools or parts may be slidably attached under the top 22 in the usual manner.

It is to be understood that the embodiment here shown and described comprehends only one of many possible forms of the invention, and I reserve the right to such alterations and variation as fall within the spirit of the invention and the scope of the claims.

What I claim is:—

1. A combination work stand comprising a pair of spaced standards, each of said standards formed at one end with a pocket, a third standard formed in the end with a channel and spaced apart from the first mentioned standards, means for preventing relative movement of said standards; and supporting blocks adapted to be detachably engaged in the pockets of the first-mentioned standards.

2. A combination work stand comprising a pair of spaced standards, each of said standards formed at one end with a pocket, a third standard formed in the end with a channel and having attaching means adjacent the end and spaced apart from the first mentioned standards; means for preventing relative movement of said standards; supporting blocks adapted to be detachably engaged in the pockets of the first-mentioned standards, and a supporting arm adapted to detachably engage with said attaching means on the last-mentioned standard.

3. A combination work stand comprising a pair of spaced standards, each standard formed at one end with a pocket, a third standard disposed in advance of the first mentioned standards and provided with a notched extremity, means for preventing relative movement of said standards, a supporting block adapted to be detachably arranged within said pockets, and a pin projecting from each of said blocks, a hanger supported from each block, and said hangers having openings for the reception of said pins, whereby said parts are held associated.

4. A work stand comprising spaced parallel standards, members projecting laterally from the standards and defining channels, a third standard disposed in advance of and between the first mentioned standards, means for preventing relative movement between the said standards, said third standard being formed with a shoulder at one side and having a notch in its upper extremity, a supporting arm adapted to rest upon said shoulder and detachably engage the same, and attaching means carried by the said third standard for said arm.

In testimony whereof I affix my signature.

JOHN A. KIMBALL.

Copies of this patent may be obtained for five cents each, by addressing the "Commissioner of Patents, Washington, D. C."